US007680495B2

(12) United States Patent
Abed et al.

(10) Patent No.: US 7,680,495 B2
(45) Date of Patent: Mar. 16, 2010

(54) METHOD AND APPARATUS FOR DESIGNING VARIOUS NETWORK CONFIGURATION SCENARIOS

(75) Inventors: Mark I. Abed, Succasunna, NJ (US); Ramesh Bollapragada, Clark, NJ (US); Thomas B. Morawski, Westfield, NJ (US); Luz Elena Pinzon, Concord, CA (US); Steven H. Richman, Marlboro, NJ (US); Raymond Abbott Sackett, Rumson, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1356 days.

(21) Appl. No.: 11/118,728

(22) Filed: Apr. 29, 2005

(65) Prior Publication Data

US 2005/0202811 A1    Sep. 15, 2005

Related U.S. Application Data

(62) Division of application No. 09/948,645, filed on Sep. 7, 2001, now Pat. No. 6,917,816.

(51) Int. Cl.
*H04W 4/00* (2006.01)
*H04L 12/28* (2006.01)
(52) U.S. Cl. .................. 455/426.2; 455/447; 455/67.11; 455/67.16; 455/446
(58) Field of Classification Search ... 455/67.11–67.16, 455/422.1, 403, 414.1, 414.4, 446–449, 450, 455/452.1, 452.2
See application file for complete search history.

(56) References Cited

U.S. PATENT DOCUMENTS

| 5,508,999 A | * | 4/1996 | Cox et al. | 370/252 |
| 5,710,758 A | * | 1/1998 | Soliman et al. | 370/241 |
| 6,151,305 A | * | 11/2000 | Chen | 370/238 |
| 2001/0051503 A1 | * | 12/2001 | Lush | 455/2.01 |

* cited by examiner

*Primary Examiner*—Melur Ramakrishnaiah
(74) *Attorney, Agent, or Firm*—Ryan, Mason & Lewis, LLP

(57) ABSTRACT

A method and apparatus are disclosed for analyzing and designing various network configuration scenarios. A modular design allows market assessment and network planning functions to be performed more efficiently and accurately using a single integrated design tool. Wired and wireless access technologies can be modeled and evaluated. In an exemplary implementation for modeling and evaluating fixed wireless access networks, the network planning tool comprises a market scenario planner, a cluster analysis tool, a hub sector planner and a network architecture planner. Generally, the market scenario planner analyzes a listing of potential customers to generate a list of target customers. The cluster analysis tool allows the network planner to identify "clusters" of demand for potential hub placement. The hub sector planner analyzes the hub assignments generated by the cluster analysis tool and allocates each building in a given hub to a particular sector. The network architecture planner processes the output of the hub sector planning tool to (i) generate a complete configuration of the network in terms of equipment requirements at each node (each building, hub and service node); and (ii) compare a set of scenarios using several financial measures.

10 Claims, 12 Drawing Sheets

ILLUSTRATION OF THE CLUSTERING ALGORITHM

FIG. 5

CLUSTER ANALYSIS HUB DATABASE

MARKET: STOCKTON

Summary of Cluster Deployment

| | BLDG ID 520 | ADDRESS 530 | LAT 540 | LONG 550 | FIBER ACCESS 555 | HUB NUMBER 560 | OPERATING RADIUS | | | RADIO LOAD (DSO) | | | TOTAL RADIO DSOs 580 | TOTAL HUB DSOs 585 | ASSIGNED BUILDINGS | | | TOTAL BLDGS 595 |
|---|---|---|---|---|---|---|---|---|---|---|---|---|---|---|---|---|---|---|
| | | | | | | | QAM 565 | QPSK 566 | PTP 567 | QAM 571 | QPSK 572 | PTP 573 | | | QAM 591 | QPSK 592 | PTP 593 | |
| 501 | CA05919 | 425 N. EL DORADO ST. FL 2 | 37.9570 | -121.2912 | NO | 1 | 0.77 | 1.28 | 1.63 | 1,734 | 674 | 222 | 2,630 | 2,780 | 12 | 6 | 2 | 20 |
| 502 | CA00658 | 1151 W. ROBINHOOD DR. | 38.0001 | -121.3208 | NO | 2 | 0.77 | 1.28 | 1.63 | 1,523 | 451 | 397 | 2,371 | 2,446 | 13 | 4 | 2 | 19 |
| 503 | CA05576 | 4719 QUAIL LAKES DR. | 37.9855 | -121.3402 | NO | 3 | 0.77 | 1.28 | 1.63 | 833 | 0 | 147 | 980 | 1,055 | 8 | 0 | 1 | 9 |
| 504 | CA03086 | 2201 W. WASHINGTON ST. 12 | 37.9455 | -121.3212 | NO | 4 | 0.77 | 1.28 | | 600 | 0 | | 600 | 675 | 5 | 0 | 0 | 5 |
| 505 | CA01925 | 1601 E. HAZELTON AVE. | 37.9501 | -121.2684 | NO | 5 | 0.77 | 1.28 | | 732 | | | 732 | 806 | 3 | 2 | 0 | 5 |
| 506 | CA00401 | 1110 W. KETTLEMAN LN. | 38.1154 | -121.2880 | NO | 6 | 0.77 | 1.28 | 1.63 | 580 | 152 | 148 | 825 | 900 | 4 | 3 | 1 | 8 |
| 507 | CA00814 | 1205 S. MAIN ST. | 37.7856 | -121.2162 | NO | 7 | 0.77 | 1.28 | 1.63 | 377 | 300 | 155 | 601 | 676 | 3 | 1 | 1 | 5 |
| 508 | CA07031 | 757 E. 11TH ST. | 37.7399 | -121.4155 | NO | 8 | 0.77 | 1.28 | 1.63 | 298 | 148 | 221 | 522 | 598 | 2 | 1 | 2 | 5 |
| 509 | CA07036 | 7650 NEWCASTLE RD. | 37.8980 | -121.2019 | NO | 9 | | | 1.63 | 152 | 149 | 305 | 305 | 454 | 0 | 0 | 2 | 2 |
| 510 | CA02122 | 16900 W. SCHULTE RD. | 37.7217 | -121.5213 | NO | 10 | | | 1.63 | | | 285 | 285 | 436 | 0 | 0 | 2 | 2 |
| 511 | ... | ... | ... | ... | ... | ... | ... | ... | ... | ... | ... | ... | ... | ... | ... | ... | ... | ... |
| 512 | CA01838 | 1500 INDUSTRIAL DR. | 37.9108 | -121.2591 | NO | 12 | | | 1.63 | | | 152 | 152 | 228 | 0 | 0 | 3 | 3 |

*FIG. 6*

CLUSTER ANALYSIS BUILDING DATABASE

| BLDG ID 620 | ADDRESS 630 | LAT 640 | LONG 650 | RADIO DSOs 660 | BLDG FIBER=0 RADIO=1 670 | HUB BLDG ID 680 | HUB NUMBER 690 | CLUSTER RADIO TYPE 695 |
|---|---|---|---|---|---|---|---|---|
| CA0626492 | 6 S. EL DORADO ST. | 37.951902 | -121.289486 | 76 | 1 | CA0525919 | 1 | QAM |
| CA0423663 | 31 E. CHANNEL ST. STE 112 | 37.954608 | -121.291195 | 77 | 1 | CA0525919 | 1 | QAM |
| CA0578680 | 509 W. WEBER AVE. FL 5 | 37.951940 | -121.300100 | 149 | 1 | CA0525919 | 1 | QAM |
| CA0525919 | 425 N. EL DORADO ST. FL 2 | 37.957012 | -121.291216 | 150 | 1 | CA0525919 | 1 | QAM |
| CA0516559 | 415 E. HARDING WAY STE H | 37.968380 | -121.290030 | 75 | 1 | CA0525919 | 1 | QPSK |
| CA0196078 | 1617 N. CALIFORNIA ST. | 37.969464 | -121.289053 | 145 | 1 | CA0525919 | 1 | QPSK |

601, 602, 603, 604, 605, 606

600

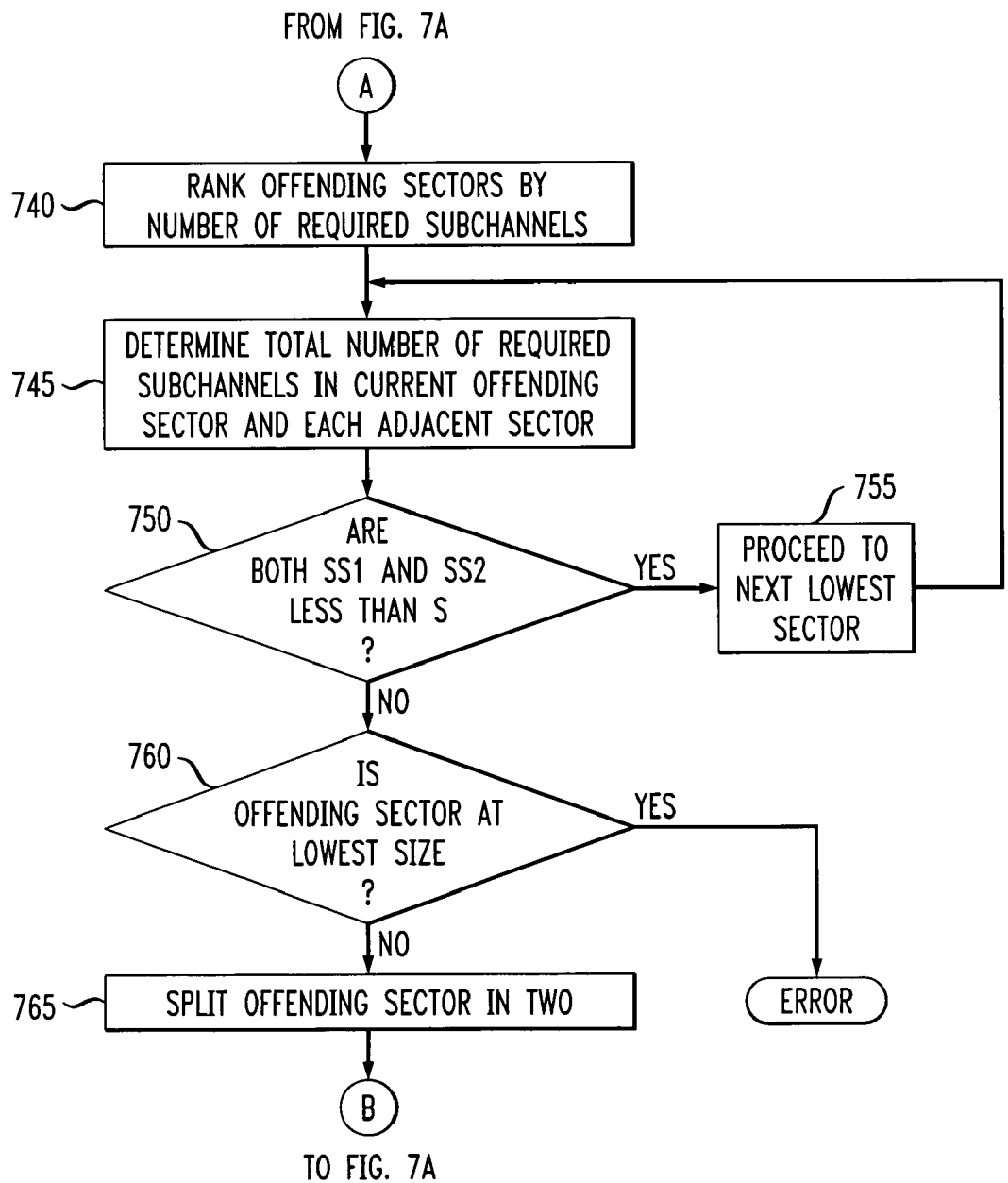

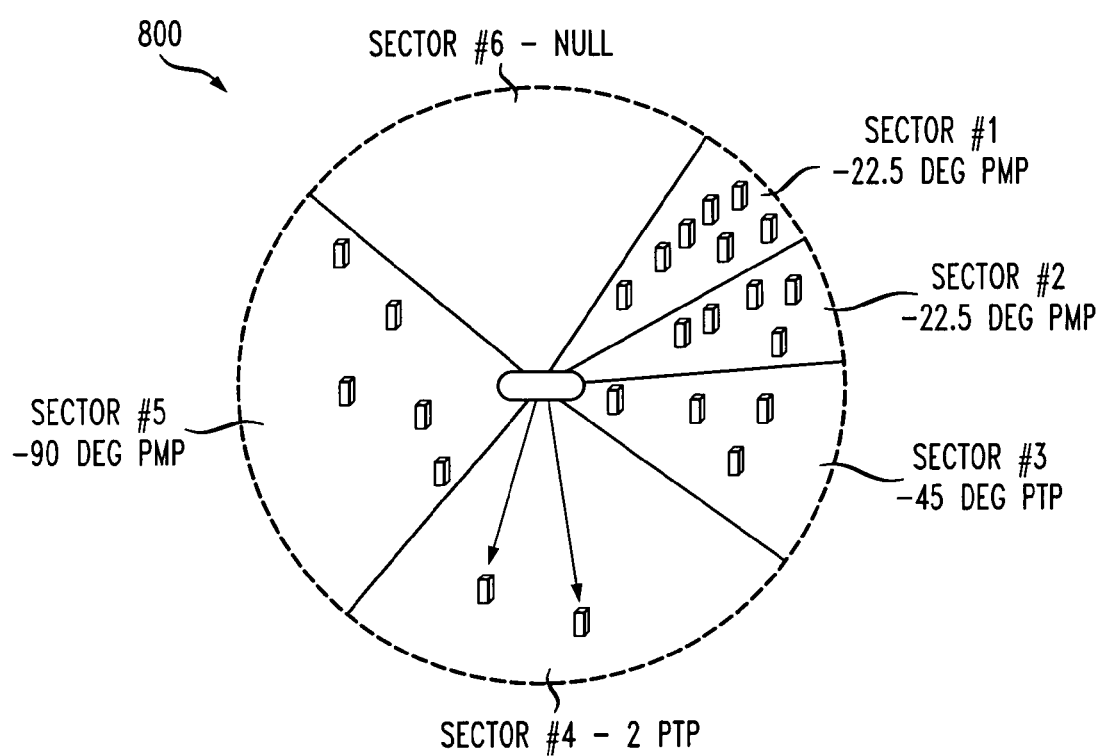

FIG. 9
HUB SECTOR DATABASE 900

| HUB SECTORS DETAILS | SEC 1 | SEC 2 | SEC 3 | SEC 4 | SEC 5 | SEC 6 | ... | SEC N |
|---|---|---|---|---|---|---|---|---|
| 901 HUB NUMBER | 4 | 4 | 4 | 4 | | | | |
| 902 SECTOR NUMBER | 1 | 2 | 3 | 4 | | | | |
| 903 ANGLE | 90 | 90 | 90 | 90 | | | | |
| 904 FROM ANGLE | 28 | 118 | 208 | 298 | | | | |
| 905 TO ANGLE | 118 | 208 | 298 | 398 | | | | |
| 906 QAM SUB-CHANNELS | | 1 | | 1 | | | | |
| 907 QPSK SUB-CHANNELS | | 1 | | | | | | |
| 908 PTP BLDGS | | | | | | | | |
| 909 TOTAL SUB-CHANNELS | | 2 | | 1 | | | | |
| 910 TOTAL SYSTEMS | | 2 | | 1 | | | | |

FIG. 10 `1000`

| HUB INFO | | | | | | |
|---|---|---|---|---|---|---|
| HUB ID: | HUB 7 | | | | | |
| HUB DISTANCE FROM SN: | 8.2 Km | | | | | |
| NUMBER OF BUILDINGS: | 1 | | | | | |
| BUILDING SUMMARY | YEAR 1 | YEAR 2 | YEAR 3 | YEAR 4 | YEAR 5 | YEAR 6 |
| VOICE PORTS (DS0) | 13 | 20 | 28 | 37 | 47 | 52 |
| FR PORTS | 1 | 1 | 1 | 1 | 2 | 2 |
| HSI PORTS | 1 | 1 | 1 | 2 | 3 | 3 |
| CELL PIPE IAD 8 | | | | | | |
| CELL PIPE IAD 4 | 5 | 8 | 10 | 14 | 17 | 19 |
| DSLAM OC-3 | | | | | | |
| DSLAM DS-3 | 1 | 2 | 2 | 2 | 3 | 3 |
| RADIO – VENDOR A | | | | | | |
| RADIO – VENDOR B | | | | | | |
| AC B-SITE | 1 | 1 | 1 | 1 | 1 | 1 |
| AC B-SITE | | | | | | |
| AC B-SITE | | | | | | |
| AC DS1 PORTS | | | | | | |
| AC DS3 ATM PORTS | 1 | 1 | 2 | 3 | 3 | 4 |
| VOICE (Mbps) | 0 | 0 | 0 | 0 | 0 | 0 |
| FR (Mbps) | 3 | 4 | 5 | 10 | 17 | 20 |
| HSI (Mbps) | | | | | | |
| COLO HUB DS3 | | | | | | |
| HUB SUMMARY | | | | | | |
| RADIO HUB – PTP | | | | | | |
| RADIO HUB – VENDOR A (SUBCHANNELS) | | | | | | |
| – VENDOR A SECTOR | | | | | | |
| RADIO HUB – VENDOR B (SYSTEMS) | 2 | 2 | 2 | 2 | 2 | 2 |
| – VENDOR B DEMOD | 1 | 1 | 1 | 1 | 1 | 1 |
| AC HUB | 1 | 1 | 1 | 1 | 1 | 1 |
| AC DS1 PORTS INPUT | | | | | | |
| AC DS3 PORTS INPUT | | | | | | |
| AC OC-3 PORTS INPUT | 4 | 4 | 4 | 4 | 4 | 4 |
| AC DS3 PORTS, HUB TO SN | 1 | 1 | 1 | 1 | 1 | 1 |
| AC OC-3 PORTS, HUB TO SN | | | | | | |
| VOICE (Mbps) | 0 | 1 | 1 | 1 | 2 | 2 |
| FR (Mbps) | 0 | 0 | 0 | 0 | 0 | 0 |
| – | | | | | | |
| HSI (Mbps) | 2 | 2 | 3 | 7 | 11 | 13 |
| HUB TO SN FACILITY LEASE EXPENSE | 30,350 | 30,350 | 30,350 | 30,350 | 30,350 | 30,350 |

*FIG. 11*

| SN NODE INFO |||||||
|---|---|---|---|---|---|---|
| SERVICE NODE  NUMBER OF BUILDINGS: 45 |||||||
| SERVICE NODE SUMMARY | YEAR 1 | YEAR 2 | YEAR 3 | YEAR 4 | YEAR 5 | YEAR 6 |
| 5ESS SWITCH | 1 | 1 | 1 | 1 | 1 | 1 |
| CBX 500 AT SN | 1 | 1 | 1 | 1 | 1 | 1 |
| AC SN | 1 | 1 | 1 | 1 | 1 | 1 |
| VOICE GATEWAY | 1 | 2 | 2 | 3 | 3 | 3 |
| DCS 3/1 | 1 | 1 | 1 | 1 | 1 | 1 |
| B-SITE T1s TO DS3-HUB (TYPE 2) | | | | | | |
| DS3-HUB T3s TO SN (TYPE 2) | | | | | | |
| DS3-HUBS (TYPE 2) | | | | | | |
| SN TO TANDEMS T3 | 4 | 4 | 4 | 4 | 4 | 4 |
| SN TO TANDEMS OC-3 | | | | | | |
| SN TO DATA NETWORKS T3 | | | | | | |
| SN TO DATA NETWORKS OC-3 | 1 | 1 | 2 | 3 | 5 | 6 |
| SN TO PL DESTINATIONS T1 | | | | | | |
| CBX 500 DS3 PORTS INPUT | 7 | 8 | 11 | 18 | 22 | 30 |
| CBX 500 OC-3 PORTS INPUT | | | | | | |
| CBX 500 OC-3 PORTS OUTPUT DATA | 1 | 1 | 2 | 3 | 5 | 6 |
| CBX 500 DS3 PORTS OUTPUT VOICE | 1 | 2 | 2 | 3 | 3 | 3 |
| CBX 500 DS3 PORTS OUTPUT PL & PBX | 1 | 1 | 1 | 1 | 1 | 1 |
| VOICE (Mbps) | 32.6 | 51.5 | 72.4 | 95.7 | 121.5 | 132.9 |
| FR (Mbps) | 1.6 | 1.7 | 2.0 | 2.6 | 4.2 | 4.6 |
| PBX (Mbps) | | | | | | |
| DATA (Mbps) | 68.2 | 118.8 | 223.6 | 360.6 | 583.3 | 815.5 |
| GATEWAY T1 PORTS TO DCS | 20 | 32 | 44 | 58 | 74 | 81 |
| SWITCH STS-1 | 2 | 3 | 3 | 4 | 5 | 5 |
| DCS DS1 INTERFACES | 20 | 32 | 44 | 58 | 74 | 81 |
| DCS DS3 INTERFACES TO TANDEMS | 4 | 4 | 4 | 4 | 4 | 4 |
| DCS STS-1 PORTS TO 5ESS TRUNKS | 1 | 2 | 2 | 3 | 3 | 3 |
| DCS STS-1 PORTS TO 5ESS TRUNKS | 1 | 1 | 1 | 1 | 2 | 2 |
| AC DS3 INPUTS | 1 | 1 | 1 | 1 | 1 | 1 |
| AC DS3 OUTPUT TO FR DATA DROP | 1 | 1 | 1 | 1 | 1 | 1 |
| AC STS-1 OUTPUT TO SWITCH | | | | | | |
| BACK-HAUL SOLUTION | | | | | | |
| CBX 500 AT LOCAL DWDM POP | | | | | | |
| AC AT LOCAL DWDM POP | | | | | | |
| VOICE GATEWAY AT REMOTE SN | | | | | | |
| DCS AT REMOTE SN | | | | | | |
| 5ESS SWITCH AT REMOTE SN | | | | | | |
| DWDM DS3 | | | | | | |
| DWDM STS-1 | | | | | | |
| TOTAL BUILDINGS - ACTIVELY MARKETED | 45 | 45 | 45 | 45 | 45 | 45 |

METHOD AND APPARATUS FOR DESIGNING VARIOUS NETWORK CONFIGURATION SCENARIOS

CROSS REFERENCE TO RELATED APPLICATIONS

This application is a divisional of U.S. patent application Ser. No. 09/948,645, filed on Sep. 7, 2001 now U.S. Pat. No. 6,917,816.

FIELD OF THE INVENTION

The present invention relates generally to network planning tools, and more particularly, to an improved network planning tool that allows various network configuration scenarios to be engineered and compared.

BACKGROUND OF THE INVENTION

In the United States, telephone service was historically provided almost exclusively by American Telephone and Telegraph, Inc. (now AT&T). Following the deregulation of the telephone industry in 1984, AT&T was limited to providing long distance telephone service, and local telephone service was thereafter provided by the Regional Bell Operating Companies (RBOCs), such as Bell Atlantic and Southern New England Telephone (now SNET). Thus, following deregulation, the Regional Bell Operating Companies (RBOCs) initially served as the exclusive local exchange carriers (LECs), and maintained the subscriber loop between the Public Switched Telephone Network (PSTN) and each individual telephone subscriber. As competition in all segments of the telephone industry increases, however, other companies are poised to provide telephone service.

The increasing demand for high-speed data transmission has further increased the demand for access in the local loop. Thus, there is a corresponding increase in the number of service providers attempting to provide direct service to customers. In order to permit competition in the local telephone market, the Regional Bell Operating Companies (RBOCs) were required to unbundle their subscriber loop, such that the Competing Local Exchange Carriers (CLECs) and other service providers can access the subscriber. Typically, the unbundling occurs along the subscriber loop, between the LEC's Central Office and the subscriber's equipment, with a costly hard-wired connection. With the increasing popularity of wireless networks, however, there are new opportunities for a service provider to access a customer without requiring a wired connection to the local loop of each subscriber.

Thus, service providers are aggressively pursuing several different wired and wireless access technologies that allow them to provide service to customers in a cost effective and efficient manner, including enhanced copper (xDSL), cable networks (HFC), 3G mobile wireless platforms, fiber optics, satellite broadband networks and fixed wireless broadband (FWB) systems. Fixed wireless broadband systems have been found to be particularly beneficial for new market entrants who do not have an existing local loop infrastructure. Among other benefits, fixed wireless broadband access networks can be deployed quickly and relatively inexpensively, offering new service providers a viable means of accessing the local subscribers.

While these emerging access technologies possess many advantages for building local access networks, they pose unique challenges for market and network planners. For example, the service provider is faced with uncertainty in the types of services required, their bandwidth over time, and the specific locations of customers that may require such services. Before the first customer can even be signed up, the service provider must typically prioritize the areas to proceed in and obtain sufficient real estate and spectrum assets for the required network elements.

Thus, before proceeding in a given new market, the service provider must perform a detailed analysis of the market to evaluate the costs and benefits of proceeding in the market. For a service provider that is interested in serving only commercial customers, the service provider typically identifies existing commercial buildings, and obtains information about the tenants and their telecommunication needs. A forecast can be generated based on existing models that correlate, for example, between industry codes, number of employees and annual revenues to predict the telecommunication needs of each potential customer.

In addition, the network infrastructure required to support the forecasted customer base must also be engineered, so that an estimate of the corresponding costs for the network infrastructure can be generated. Generally, the network planner must determine the appropriate size, location, and timing of required network components that minimizes the business risk and satisfies the bandwidth requirements. The number and location of nodes in a broadband network typically have a cascading impact on equipment costs within the nodes and on transmission costs from the individual nodes to a centralized node that connects to other networks, such as the PSTN. Therefore, the network planner must quantify the overall cost for each network configuration option that is examined. In this manner, the service provider can make an informed decision about whether to proceed in a given market and can prioritize markets, market strategies and customer segments.

FIG. 1 is a schematic block diagram of a conventional fixed wireless broadband network 100. As shown in FIG. 1, the fixed wireless broadband network 100 generally consist of one or more service nodes (SN), such as the service node 110, and hubs nodes, such as the hub nodes 120-1 through 120-3 (hereinafter, collectively referred to as hub nodes 120). The centrally located service node 110 serves as a gateway to other networks, such as the Internet 140, the PSTN 150, or other service nodes 160. A service node 110 contains the centralized switching and routing equipment, as well as service-specific servers, in a known manner. Traffic flows from the service node 110 to the intermediate hub nodes 120 located near end-user buildings, such as end-user buildings 125-1 through 125-N (hereinafter, collectively referred to as end-user buildings 125). Hub nodes 120 contain point-to-point or point-to-multipoint wireless base stations that communicate with the multiple end-user buildings 125. Multiplexing and transmission equipment in the hub nodes 120 concentrates traffic to provide more economical transmission to the service node 110. A wireless connection 122 is typically used to connect the end-user building 125 to the corresponding hub node 120. The hub-to-service node connection typically utilizes a wireline link 115, such as a fiber connection. For a more detailed discussion of the elements in a fixed wireless broadband network, see, for example, Martin P. Clarke, "Wireless Access Networks," John Wiley & Sons, 2000, incorporated by reference herein.

A need therefore exists for an improved method and apparatus for analyzing and designing various network configuration scenarios. A further need exists for a network planning tool that analyzes the effects of variations in service demand on equipment configurations and network topology; analyzes the costs and benefits of a given configuration; and provides necessary information for implementing a desired configuration.

SUMMARY OF THE INVENTION

Generally, a method and apparatus are disclosed for analyzing and designing various configuration scenarios for a communication network. The disclosed network planning tool employs a modular design that allows market assessment and network planning functions to be performed more efficiently and accurately using a single integrated design tool. The present invention can model and evaluate network scenarios for both wired and wireless access technologies.

In an exemplary implementation for modeling and evaluating fixed wireless access networks, the network planning tool comprises four main modules, namely, a market scenario planner, a cluster analysis tool, a hub sector planner and a network architecture planner. Generally, the market scenario planner analyzes market-specific data for potential customers to generate a list of target customers. A given service provider can create the market-specific data by gathering market information and applying well-known models to predict the telecommunications needs of target customers. The original potential customer list may be filtered, for example, based on certain parameters, such as building type, number of tenants or employees, minimum demand levels, or minimum projected revenues. In addition, the market scenario planner can estimate how the initial demand for the various services will grow over time. By varying the filtering and/or demand parameters using the market scenario planner, a number of scenarios can be created that can then be processed by the other modules.

The cluster analysis tool allows the network planner to identify "clusters" of demand for potential hub placement. More specifically, the cluster analysis tool processes the target customers identified by the market scenario planner and determines an optimal location for the hub sites, their associated customer buildings and the detailed access method per building, based on the distance of the buildings to each possible hub and the total bandwidth served from the hub. Generally, the serving radius of the selected radio technology and vendor provide a collection of hub sites that cover the maximum amount of demand subject to user-configurable upper and lower bandwidth thresholds.

The hub sector planner analyzes the hub assignments generated by the cluster analysis tool (i.e., the hub locations, covered buildings and their access type) and allocates each building in a given hub to a particular sector. The hub sector planner takes into account the selected radio technology, its frequency bandwidth requirements for the given configuration, and the number of FCC channels that are held by the service provider (or are planned to be obtained). The hub sector planner indicates which and how many buildings can be served by the selected configuration for the assumed number of available FCC channels. The output of the exemplary hub sector planner also identifies hub locations, their associated buildings that can be served and the building and hub radio equipment requirements.

The network architecture planner processes the output of the hub sector planning tool to generate a complete configuration of the network in terms of equipment requirements at each building, hub and service node of the overall access network. The network architecture planner provides a year-by-year equipment bill of materials for each network element or node, as well as the bandwidth requirements between such nodes, from which corresponding capital and operational expenses can be derived for the scenario. Revenue models included in the network architecture planner allow the service provider to consider various pricing strategies for the services offered. Once the expense and revenue information is available, the network architecture planner includes business measures that allow the service provider to evaluate the scenario with known business measures. In this manner, various scenarios can be compared and analyzed simultaneously, thus allowing the planner to select a robust network solution.

A more complete understanding of the present invention, as well as further features and advantages of the present invention, will be obtained by reference to the following detailed description and drawings.

BRIEF DESCRIPTION OF THE DRAWINGS

FIG. 5 is a sample table from an exemplary cluster analysis hub database generated by the cluster analysis tool of FIG. 3;

FIG. 6 is a sample table from an exemplary cluster analysis building database generated by the cluster analysis tool of FIG. 3;

FIGS. 7A and 7B, collectively, are a flow chart describing an exemplary implementation of the hub sector planner of FIG. 2;

FIG. 8 illustrates a hub sectoring output produced by the hub sector planner of FIG. 7;

FIG. 9 is a sample table from a hub sector database generated by the hub sector planner of FIG. 7;

FIG. 10 illustrates a hub equipment listing identifying all equipment components required for a given hub and its assigned buildings under a certain scenario, as generated by the network architecture planner of FIG. 2; and FIG. 11 illustrates a service node equipment listing identifying all equipment components required for a given service node under a certain scenario, as generated by the network architecture planner of FIG. 2.

DETAILED DESCRIPTION

The present invention provides a market assessment and network planning tool 200, hereinafter referred to as network planning tool 200, discussed below in conjunction with FIG. 2. The network planning tool 200 allows network planners to incorporate various levels of demand uncertainties and focus on the financial outcomes of various test cases before the actual network is implemented. While the exemplary network planning tool 200 models a fixed wireless access network, the present invention may be applied to model and evaluate network scenarios for other wired or wireless access technologies, as would be apparent to a person of ordinary skill in the art.

Figure 1:
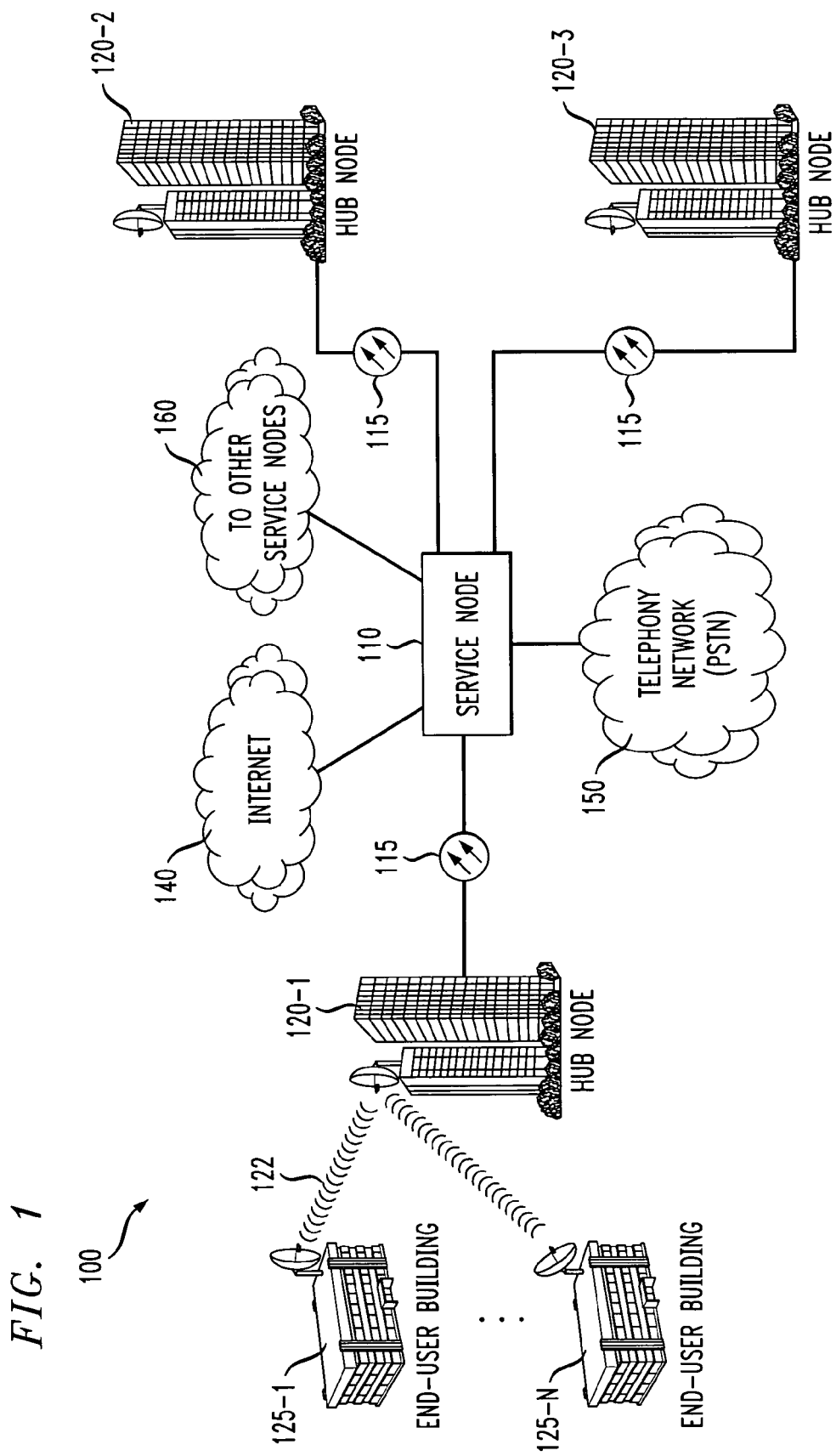
FIG. 1 is a schematic block diagram of a conventional fixed wireless broadband network.
Figure 2:
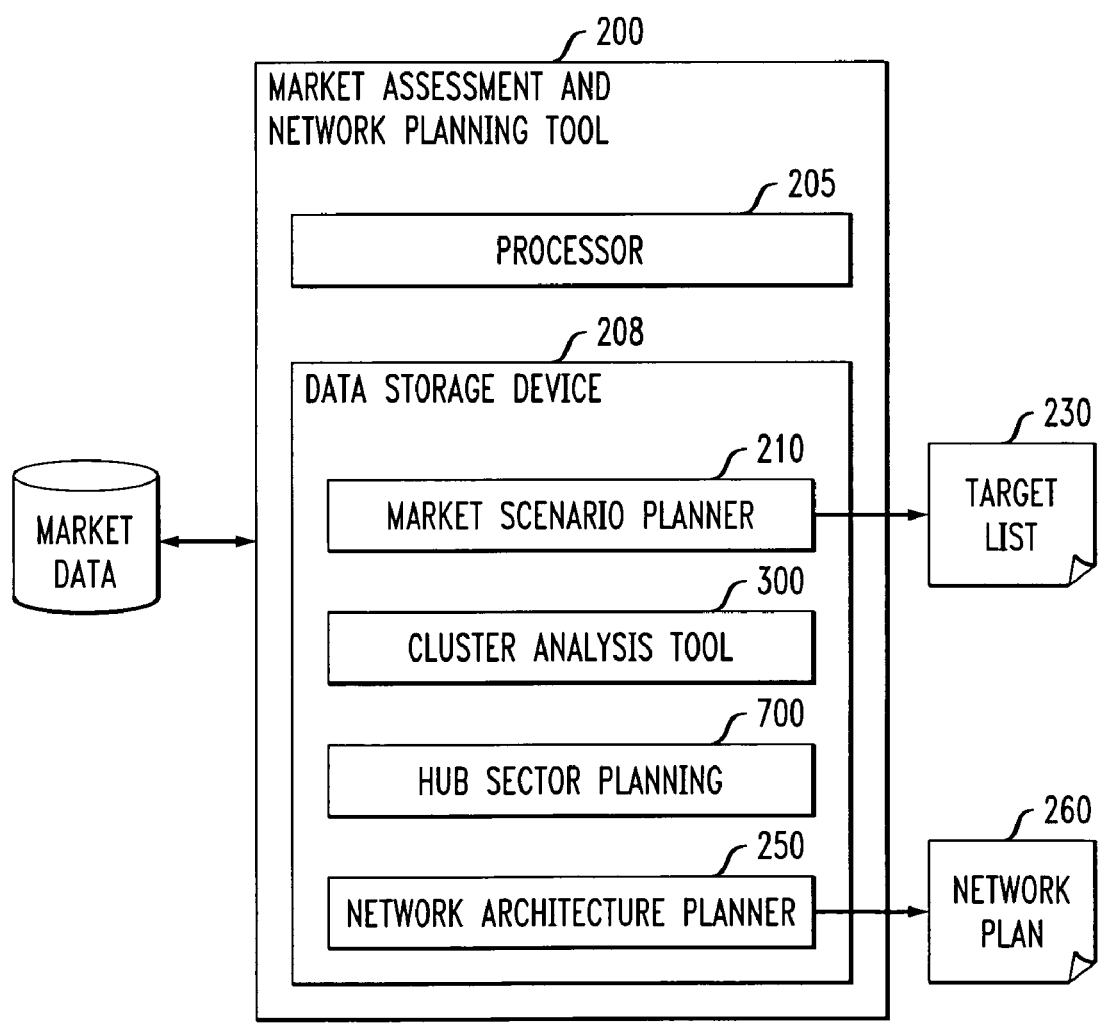
FIG. 2 is a schematic block diagram of a market assessment and network planning tool in accordance with the present invention.

As shown in FIG. 2, the network planning tool 200 comprises four main modules, namely, a market scenario planner 210, a cluster analysis tool 300, a hub sector planner 700 and a network architecture planner 250. Generally, the market scenario planner 210 analyzes a listing of potential customers to generate a list of target customers. The cluster analysis tool 300 allows the network planner to identify "clusters" of demand for potential hub placement. The hub sector planner 700 analyzes the hub assignments generated by the cluster analysis tool 300 and allocates each building in a given hub to a particular sector. The network architecture planner 250 processes the output of the hub sector planning tool 700 to (i) generate a complete configuration of the network in terms of equipment requirements at each node (each building, hub and service node); and (ii) compare a set of scenarios using several financial measures.

As shown in FIG. 2, the network planning tool 200 includes a processor 205 and a data storage device 208. Data storage device 208 will configure the processor 205 to implement the methods, steps, and functions disclosed herein. The data storage device 208 could be distributed or local and the processor 205 could be distributed or singular. The data storage device 208 could be implemented as an electrical, magnetic or optical memory, or any combination of these or other types of storage devices. The term "memory" should be construed broadly enough to encompass any information able to be read from or written to an address in the addressable space accessed by processor 205. With this definition, information on a network is still within the data storage device 208 because the processor 205 can retrieve the information from the network.

Market Scenario Planner

The market scenario planner 210 allows parameters to be specified to form a "scenario" that is carried over into subsequent modules. As shown in FIG. 2, the market scenario planner 210 reads in market-specific data 220 for various end-user buildings in the market. Generally, the market-specific data 220 contains information about potential customers in the target market, including address information. Typically, a given service provider will create the market-specific data 220 by gathering market information, e.g., from the Dun & Bradstreet business database, and applying well-known models to predict the telecommunications needs of target customers. Thus, in the exemplary embodiment, the market-specific data 220 may include a record for each end-user building in the market and, for each building, indicate characteristics such as: building address, building size, latitude, longitude, tenant SIC codes, tenant revenue, number of tenant employees, building type (e.g., commercial, multi-tenant, warehouse storage, educational or government), and the initial demand estimates for various telecommunication services.

The market scenario planner 210 allows the user to optionally filter the original set of buildings from the market-specific data 220 based on certain parameters, such as building type, number of tenants or employees, minimum demand levels, or minimum projected revenues, to generate a list of target customers 230. In addition, the market scenario planner 210 estimates how the initial demand for the various services will grow in each time interval of the planning period. This is done based on user-specified parameters such as the number of lines and bandwidth growth per year, concentration rates, and market share. Thus, by varying the filtering and/or demand parameters, a number of scenarios can be created through the market scenario planner 210 that can then be processed by the other modules.

Cluster Analysis Tool

Generally, the cluster analysis tool 300 in the exemplary embodiment designs the market clusters for point-to-point and point-to-multipoint microwave radio systems, based on the bandwidth demand from customers in the area. The cluster analysis tool 300 selects buildings to serve as hubs and assigns other buildings to the selected hubs, based on the distance of the building to each possible hub and the total bandwidth served from the hub. Thus, the cluster analysis tool 300 processes the target customer list 230 from the market scenario planner 210 and determines an optimal location for the hub sites, their associated customer buildings and the detailed access method per building. In one embodiment, if a given service provider has already established a hub in a given market, the corresponding building can optionally be preselected as a hub. In addition, any end-user buildings served by the preexisting hub can be removed from consideration.

Based on a geographic distribution of demand, the selected radio technology (such as point-to-point, point-to-multipoint, or a hybrid), and the equipment vendor (whose products may vary in their use of spectrum), the cluster analysis tool 300 determines the number of radio hubs that are required to serve the end-user buildings. As discussed hereinafter, the cluster analysis tool 300 evaluates the possible hub locations by evaluating, e.g., minimum demand thresholds, bandwidth capacity of the selected vendor and an appropriate rain radius for the area for the different technologies. It is noted that the distance limitations between the hub node and end-user buildings can vary in accordance with climate conditions called here Crane Regions. For each identified (potential) hub, the cluster analysis tool 300 determines a building assignment based on distance and available capacity at the hub.

Generally, the serving radius of the selected radio technology and vendor provide a collection of hub sites that cover the maximum amount of demand subject to selectable upper and lower bandwidth thresholds. Constraints of RF range and bandwidth capacity of the vendor equipment are taken into account in the clustering algorithms. In addition, the distance between hubs can be taken into account to minimize hub-to-hub RF interference.

Figure 3:
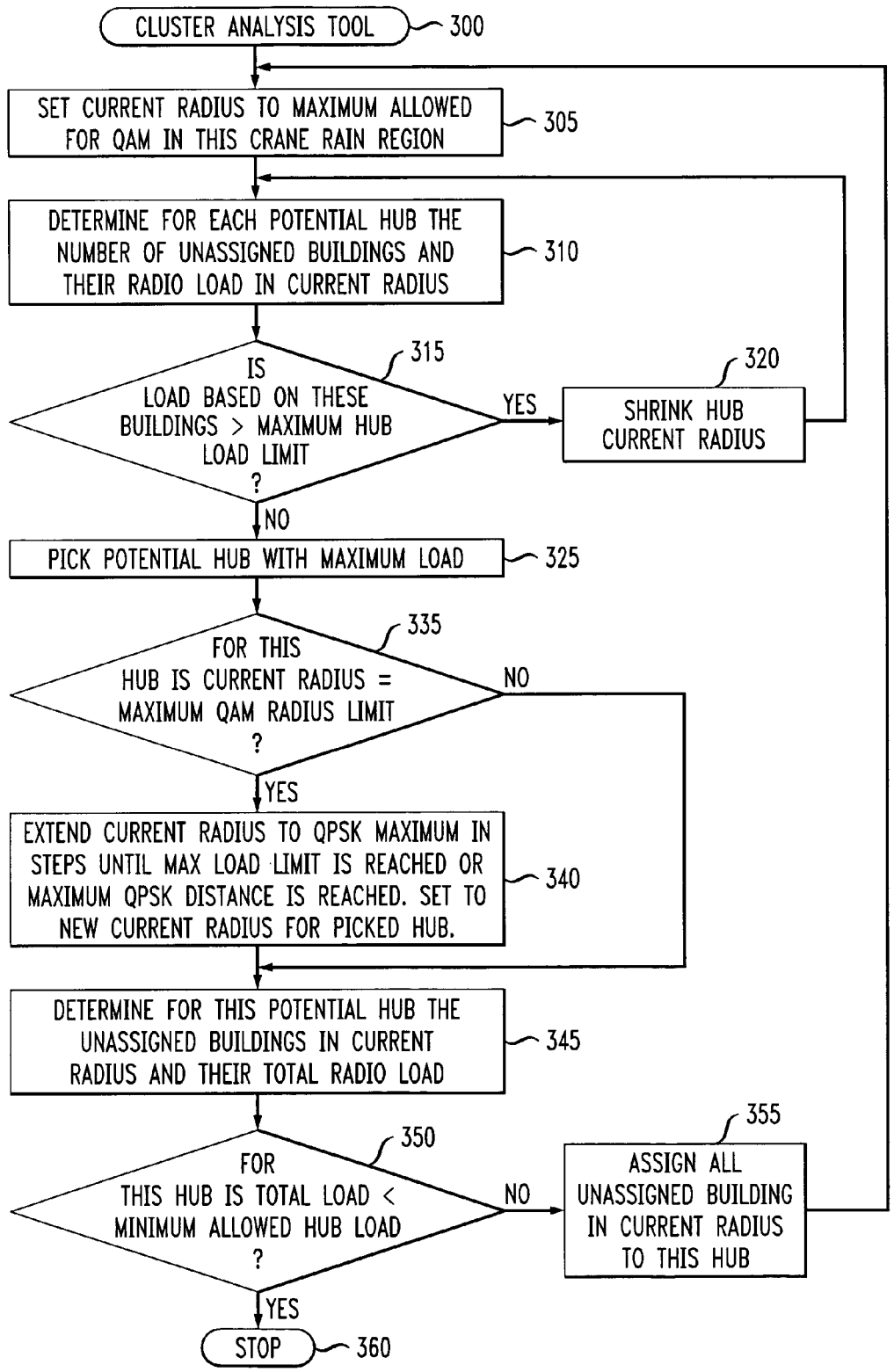
FIG. 3 is a flow chart describing an exemplary implementation of the cluster analysis tool of FIG. 2.

FIG. 3 is a flow chart describing an exemplary implementation of the cluster analysis tool 300. As shown in FIG. 3, the cluster analysis tool 300 initially determines an initial radius value during step 305, based on the climate of the market being considered, and vendor information. In this embodiment, the QAM radius limit is established first. Thereafter, the cluster analysis tool 300 examines the QAM load for each potential hub during step 310.

A test is performed during step 315 to determine if any potential hub has too much demand for the unassigned buildings within the current radius. If it is determined during step 315 that one or more potential hubs have too much demand for the unassigned buildings within the current radius, then the hub radius is reduced to current radius using a specified decrement amount during step 320. If, however, it is determined during step 315 that no potential hub has too much demand for the unassigned buildings within the current radius, then all buildings (potential hubs) are within the prespecified hub capacity and program control proceeds to step 325.

The potential hub with the maximum load is selected as a hub during step 325 for further inspection. A test is performed during step 335 to determine if the selected hub candidate's current radius is equal to the QAM maximum radius. If it is, then step 340 is performed which determines whether additional capacity can be added by expanding the current radius beyond QAM into the QPSK region. It is increased until either the hub capacity limit is reached or the QPSK distance is reached whichever occurs first. In either case, step 345 is performed based on the current radius.

The total load for the selected hub candidate from all unassigned buildings is determined using the current radius in step 345. Then in step 350, a test is made to see if this load is below the minimum allowed for a hub. If so, then the algorithm stops (step 360). If the load is above the minimum, however, then step 355 is performed.

In step 355, all unassigned buildings within the current radius for the selected hub are assigned to it and control goes back to step 305. This algorithm continues until step 360 is reached.

In further variations of the cluster analysis tool 300, the algorithm can consider the relative cost advantage of various technologies, such as QAM versus QPSK. In addition, the minimum distance of each additional hub from all other hubs in the network can be considered to ensure that each new hub is positioned at a safe distance from all other hubs to minimize the potential radio interference resulting from hub proximity.

Figure 4:
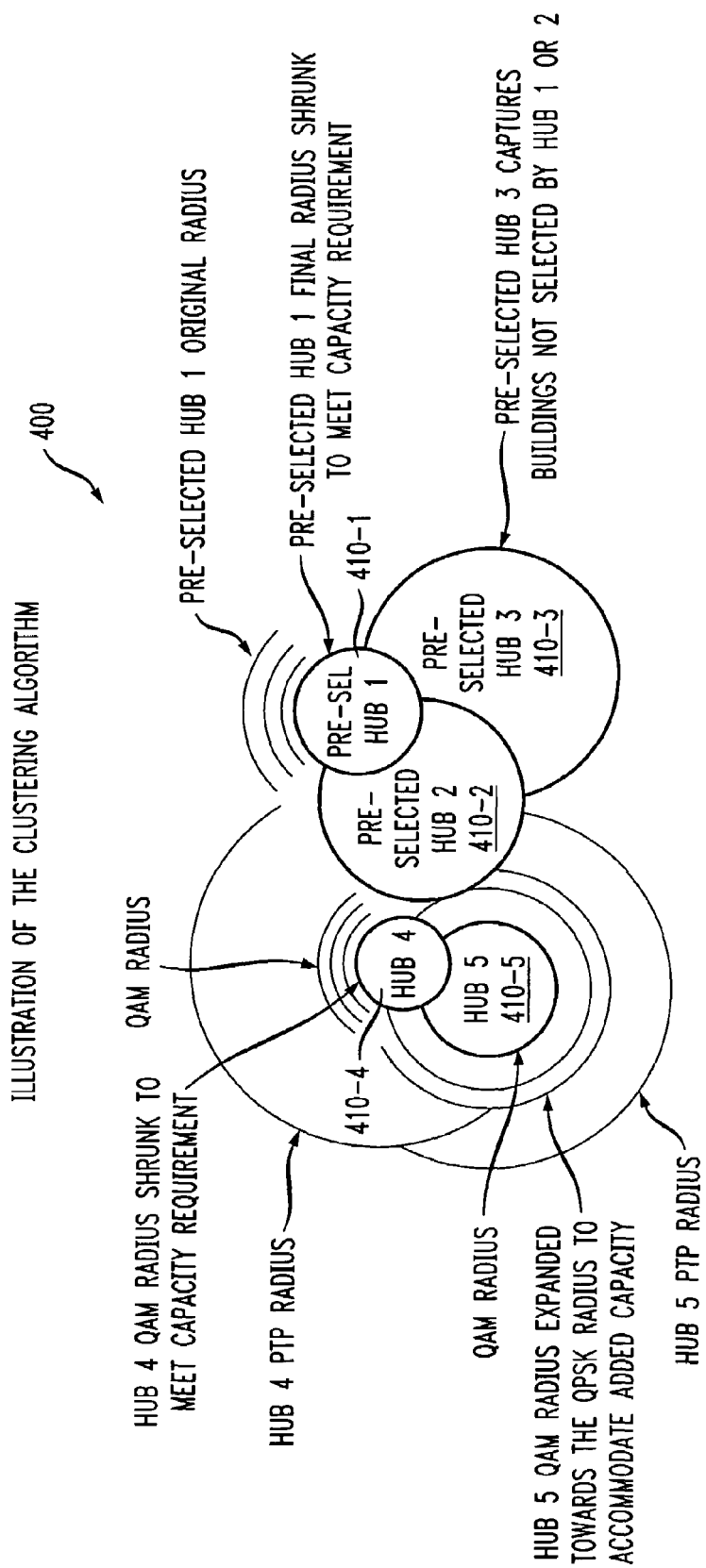
FIG. 4 illustrates a hub cluster diagram generated by the cluster analysis tool of FIG. 3.

FIG. 4 illustrates a hub cluster diagram 400 generated by the cluster analysis tool 300. As shown in FIG. 4, the cluster analysis tool 300 has assigned the various buildings in the target list 230 to five different hubs 410-1 through 410-5. Hubs 410-1, 410-2 and 410-3 correspond to pre-selected hubs, such as hubs already established in a given market. Pre-selected hub 410-2 captures some buildings within the area of hub 410-1 but not selected by hub 410-1. Pre-selected hub 410-3 captures some buildings within the area of hubs 410-1 and 410-2 but not selected by hubs 410-1 or 410-2. The radius of the exemplary hubs 410-1 and 410-4 has been reduced to meet the capacity requirement (during step 320). The radius of the exemplary hub 410-5 has been increased to towards the technology limit (QPSK) to accommodate additional capacity (during step 350).

FIG. 5 is a sample table from an exemplary cluster analysis hub database 500. The cluster analysis hub database 500 records information about each hub that is assigned by the cluster analysis tool 300. As shown in FIG. 5, the cluster analysis hub database 500 includes a plurality of records, such as records 501-512, each associated with a different hub. For each hub identified in field 520, the cluster analysis hub database 500 identifies the building address, as well as its latitude and longitude in fields 530, 540 and 550, respectively. A flag in field 555 indicates whether the building has fiber access. Field 560 identifies the assigned hub number. Fields 565-567 indicates the operating radius for various technologies and fields 571-573 indicates the radio load for various technologies. Fields 580 and 585 indicate for each hub the total radio load at the hub (DS0s not including those at the hub building itself) and the total load to be backhauled (total DS0s including those at the Hub itself), respectively. The number of buildings assigned for each technology type is set forth in fields 591-593, and the total number of buildings is indicated in field 595.

FIG. 6 is a sample table from an exemplary cluster analysis building database 600. The cluster analysis building database 600 records information about each building, including its hub assignment. As shown in FIG. 6, the cluster analysis building database 600 includes a plurality of records, such as records 601-606, each associated with a different building. For each building identified in field 620, the cluster analysis building database 600 identifies the building address, as well as its latitude and longitude in fields 630, 640 and 650, respectively. The number of radios assigned to the building are indicated in field 660, and a flag in field 670 indicates whether the building has fiber access. A hub building identifier and hub number assignment are set forth in fields 680 and 690, respectively. The cluster radio type for the building is recorded in field 695.

Hub Sector Planning

The hub sector planning module 700 processes the output from the cluster analysis tool 300 (i.e., the hub locations, covered buildings and their access type), and provides an estimate of the minimum radio equipment required at each building and hub site to assess the feasibility of such an assignment based on the available FCC channels.

As discussed below in conjunction with FIG. 7, the hub sector planner 700 determines the best radio sector configuration for each hub in terms of the subsystems that are required to cover the buildings in the cluster. The hub sector planner 700 takes into account the selected radio technology, its frequency bandwidth requirements for the given configuration, and the number of FCC channels that are held by the service provider (or are planned to be obtained). In addition, the hub sector planner 700 generates an indication of which and how many buildings can be served by the selected configuration for the assumed number of available FCC channels. In this manner, the network planner can determine the minimum number of FCC channels required per serving area for this scenario. The hub sector planner 700 accounts for RF interference for the selected technologies and equipment, based on the bandwidth requirements of the individual buildings and their geographic locations. The output of the hub sector planner 700 also identifies hub locations, their associated buildings that can be served and the building and hub radio equipment requirements.

Figure 7A:
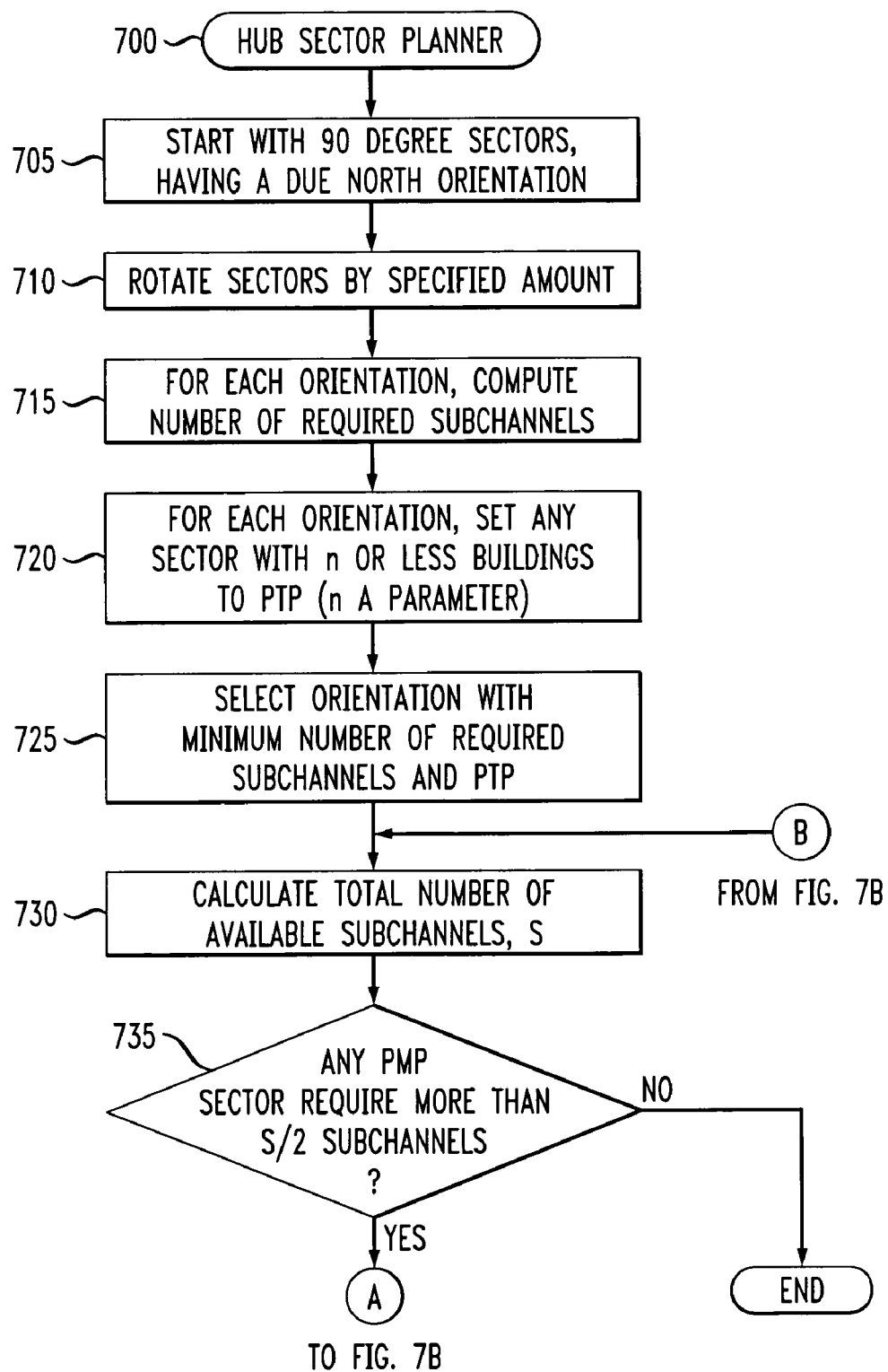

FIGS. 7A and 7B, collectively, are a flow chart describing an exemplary implementation of the hub sector planner 700. Generally, the hub sector planner 700 determines the minimum number of subsystems and sectors for a given hub. As shown in FIG. 7A, the hub sector planner 700 initially starts with 90 degree sectors, having an orientation due north (0 degrees) during step 705. Thereafter, the sectors are rotated by a specified amount, such as two degrees, during step 710. For each orientation, the number of subchannels for each technology are computed during step 715. In addition, for each orientation, any sector with less than a specified threshold for the minimum number of buildings allowed in a point-to-multipoint sector, e.g., five (5), is set to a point-to-point mode during step 720. The orientation with the minimum number of sub-channels and point-to-point (PTP) is selected during step 725.

The total number of available subchannels, S, is determined during step 730, for example, based on existing FCC licenses. A test is performed during step 735 to determine if any point-to-multipoint sector has more than S/2 subchannels. If it is determined during step 735 that no point-to-multipoint sector requires more than S/2 subchannels, then program control terminates.

If, however, it is determined during step 735 that a point-to-multipoint sector requires more than S/2 channels, then program control proceeds to step 740 (FIG. 7B). The offending sectors are ranked during step 740 by the number of required subchannels. Thereafter, the number of required subchannels in the current offending sector and each adjacent sector (SS1 and SS2) are determined during step 745. A test is performed during step 750 to determine if both SS1 and SS2 are less than S. If it is determined during step 750 that both SS1 and SS2 are less than S, then control proceeds with the next lowest ranked sector at step 745.

If, however, it is determined during step 750 that both SS1 and SS2 are less than S, then a further test is performed during step 760 to determine if the offending sector is at its lowest size allowed, such as 22.5 degrees. If it is determined during step 760 that the offending sector is at its lowest size allowed, then an error has occurred, because there is too much demand in the offending sector.

If, however, it is determined during step 760 that the offending sector is not at its lowest size allowed, then the offending sector is split in two during step 765 and program control returns to step 730 (FIG. 7A) and continues in the manner described above. In this manner, the hub sector planner 700 continues until no SS1 or SS2 is greater than S or the offending sectors cannot be split anymore.

FIG. 8 illustrates the hub sectoring output 800 of the hub sector planner 700. As shown in FIG. 8, for a given hub, the hub sector planner 700 determines the minimum number of subsystems and sectors to service the assigned buildings. For example, sector 1 has been reduced to 22.5 degrees to service seven buildings in a point-to-multipoint mode. Sector 3 has been reduced to 22.5 degrees to service five buildings in a point-to-point mode. Sector 2 has been reduced to 45 degrees to service four buildings in a point-to-multipoint mode. It is noted that sectors 1 through 3 collectively comprise 90 degrees. Sector 4 services 2 buildings in a point-to-point mode. Likewise, sector 5 services five buildings in a point-to-multipoint mode.

FIG. 9 is a sample table from a hub sector database 900 generated by the hub sector planner 700. Generally, the hub sector database 900 records sector information for each hub. As shown in FIG. 9, the hub sector database 900 includes a plurality of records, such as records 901-910, each associated with a different characteristic of the hub. In addition, the hub sector database 900 includes fields for each sector of the hub. For the exemplary hub shown in FIG. 9, four sectors 1-4 have been established, each with 90 degrees. Sector 1 extends from 28-118 degrees, sector 2 extends from 118-208 degrees, sector 3 extends from 208-298 degrees and sector 4 extends from 298-28 (388) degrees.

Network Architecture Planner

The network architecture planner 250 processes the output of the hub sector planning tool 700 to perform two main functions. First, as discussed below in conjunction with FIGS. 10 and 11, the network architecture planner 250 generates a complete configuration of the network in terms of equipment requirements at each node (each building, hub and service node). Second, the network architecture planner compares a set of scenarios using several financial measures In determining the equipment requirements for each network node, the network architecture planner 250 uses a fixed network architecture that is assumed for the service provider to offer their various services. The network configuration takes into account, for example the location of the service node (which could be local or remote), location of data/ tandem Point of Presence (PoPs), traffic concentration parameters, and the targeted year that each hub is to come online. Thus, the network architecture planner 250 provides a year-by-year equipment bill of materials for each network element or node, as well as the bandwidth requirements between such nodes.

From the equipment listings, as illustrated in FIGS. 10 and 11, the network architecture planner 250 also derives the corresponding capital and operational expenses for one or more scenarios under consideration. In addition, the revenue model included in the network architecture planner 250 allows the service provider to consider various pricing strategies for their services offered. Once the expense and revenue information is available, the "Financial" capability of the network architecture planner 250 further allows the service provider to evaluate the scenario with known business measures. These include: Cash Flow, Balance Sheet, Earnings Before Interest, Taxes, Depreciation, and Amortization (EBITDA), and Net Income. In this manner, the network planner can evaluate a specific network configuration scenario.

The "portfolio" capability of the network architecture planner 250 allows the network planner to capture (save) the results of several different scenarios. These scenarios can be compared and analyzed simultaneously, in terms of the aforementioned business measures, thus allowing the planner to select a robust network solution.

FIG. 10 illustrates a hub equipment listing 1000 identifying all equipment components required for a given hub and its assigned buildings under a certain scenario. Generally, the hub equipment listing 1000 is a year-by-year list of equipment facilities to be deployed for all the buildings in a given hub, and for the hub itself. FIG. 11 illustrates a service node equipment listing 1100 identifying all equipment components required for a given service node under a certain scenario. Generally, the service node equipment listing 1100 is a year-by-year list of equipment facilities to be deployed for a given service node.

It is to be understood that the embodiments and variations shown and described herein are merely illustrative of the principles of this invention and that various modifications may be implemented by those skilled in the art without departing from the scope and spirit of the invention.

What is claimed is:

1. A method for designing a fixed wireless broadband network, comprising:
    analyzing a list of potential end-user buildings, including location and demand forecast information; and
    selecting end-user buildings as hubs for said fixed wireless broadband network and assigning additional end-user buildings to said selected hubs based on a distance of said end-user buildings to each possible hub and said forecasted demand served from said hub.

2. The method of claim 1, wherein said selecting step considers a selected radio technology.

3. The method of claim 1, wherein said selecting step considers an equipment vendor of elements in said fixed wireless broadband.

4. The method of claim 1, wherein said selecting step considers climate conditions.

5. The method of claim 1, further comprising the steps of preselecting a given end-user building as a hub if it has already been established in a given market and removing any associated end-user buildings served by the preexisting hub.

6. The method of claim 1, wherein said selecting step further comprises the step of comparing a demand load of each potential hub to a user-configurable minimum threshold.

7. The method of claim 6, wherein said selecting step further comprises the step of reducing a radius of a potential hub if a predicted load of said potential hub is above said user-configurable minimum threshold.

8. The method of claim 1, wherein said selecting step further comprises the step of increasing a radius of a potential hub in increments up to a predefined technology limit and comparing a load of said potential hub to a user-configurable minimum demand threshold.

9. The method of claim 1, further comprising the step of generating a list of said end-user buildings with said location information and said hub assignments.

10. A system for designing a fixed wireless broadband network, comprising:
- a memory that stores computer-readable code; and
- a processor operatively coupled to said memory, said processor configured to implement said computer-readable code, said computer-readable code configured to:
- analyze a list of potential end-user buildings, including location and demand forecast information; and
- select end-user buildings as hubs for said fixed wireless broadband network and assigning additional end-user buildings to said selected hubs based on a distance of said end-user buildings to each possible hub and said forecasted demand served from said hub.

* * * * *